Figure 1:
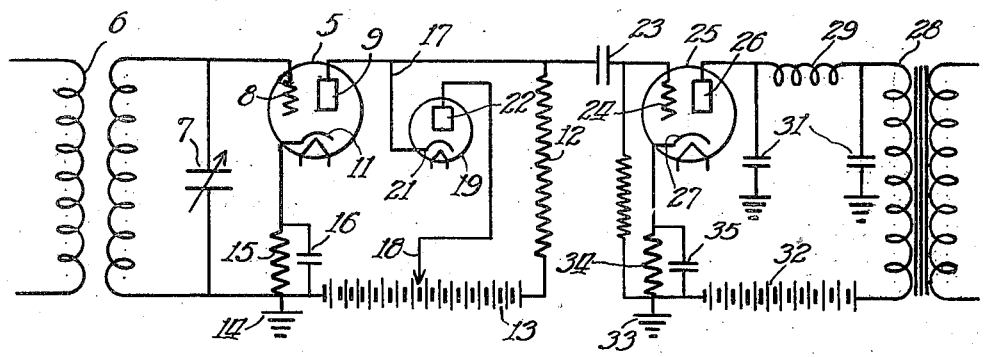

Inventor
Harry C. Duft

Inventor
Harry C. Duft

March 19, 1935.   H. C. DUFT   1,994,506
RADIO DETECTOR SYSTEM
Filed Dec. 15, 1930   3 Sheets-Sheet 3

Inventor
Harry C. Duft

UNITED STATES PATENT OFFICE 1,994,506

RADIO DETECTOR SYSTEM

Harry C. Duft, Chicago, Ill., assignor to Western Electric Company, Incorporated, New York, N. Y., a corporation of New York Application December 15, 1930, Serial No. 502,326

11 Claims. (Cl. 250—27)

My invention relates to a radio circuit and more particularly to a circuit and apparatus for detecting radio frequency signals.

Detector systems in common use today rely upon the grid current of an audion or upon the asymmetric characteristics of an audion, whereby one side of a radio frequency wave is amplified to a greater degree than the other to obtain rectification. This results in low amplification in the detector stage of the receiver and poor rectification since the detector audion is called upon to perform two functions, namely rectification and amplification, the best conditions for one of which are different than for the other.

An object of my invention is to provide a new and improved detector circuit.

A further object is to provide a rectifier associated with the anode circuit of an audion.

A further object is to provide a full wave detector.

Other objects and advantages will appear as the description proceeds.

Referring to the drawings,

Fig. 1 is a diagrammatic illustration of a circuit embodying my invention, and

Figs. 2, 3, 4, 5, and 6 illustrate modified forms of the invention.

The circuit shown in Fig. 1 includes a thermionic device or audion 5 having a tuned radio frequency input circuit comprising a transformer 6 and variable condenser 7. The thermionic device 5 has the usual grid 8, plate or anode 9, and an indirectly heated cathode 11. The anode circuit of the thermionic device includes a suitable impedance such as a resistance element 12 and a source of energy illustrated for convenience as a battery 13. The negative side of the battery is preferably grounded at 14 and a resistance 15 and by-pass condenser 16 are provided to negatively bias the grid 8 relative to cathode 11.

It is evident that when a constant current is flowing in the anode circuit; that is, when no signal is impressed upon the grid, the point 17 and a point 18 of the source 13 will be at equal potentials. A rectifier of any suitable type such as a crystal or a thermionic rectifier 19 is connected across these points. Rectifier 19 consists of an indirectly heated cathode 21 and an anode 22. This rectifier may be made to have a very low impedance by properly selecting the size and spacial relation of the cathode and anode.

Either cathode 21 or plate 22 may be connected to point 17, depending upon whether it is desired to suppress the negative or positive portion of the radio frequency wave.

When an alternating current is impressed upon grid 8, point 17 will alternately tend to become positive and negative with respect to point 18; however, on account of rectifier 19, one side of the alternating current wave will be eliminated. The other side of the alternating current wave will be impressed through condenser 23 upon the grid 24 of a thermionic device 25. Condenser 23 merely serves to prevent the high potential of source 13 from reaching grid 24 of device 25.

Thermionic device 25 has in addition to grid 24 an anode 26, and an indirectly heated cathode 27 and serves to amplify the rectified radio frequency signals supplied thereto. The anode circuit of this device includes an audio transformer and a filter circuit having a radio frequency choke coil 29 and filter condensers 31. A source of energy 32 is connected at one side to transformer 28 and grounded on the other side at 33. The cathode lead of this device has a biasing resistor 34 and by-pass condenser 35 similar to that of device 5.

It will be noted that the load on thermionic device 25 is reduced to substantially one-half of what it would be if one side of the radio frequency wave were not eliminated in the preceding stage. Thus, a greater amplification of useful radio frequency energy may be had without overloading a last radio frequency amplifier audion.

While it was stated that the point 18 may be adjusted to render points 17 and 18 equipotential, it may be advantageous in some cases to bias one point with respect to the other, as for instance when the radio frequency wave is not modulated one hundred percent.

Figure 2:
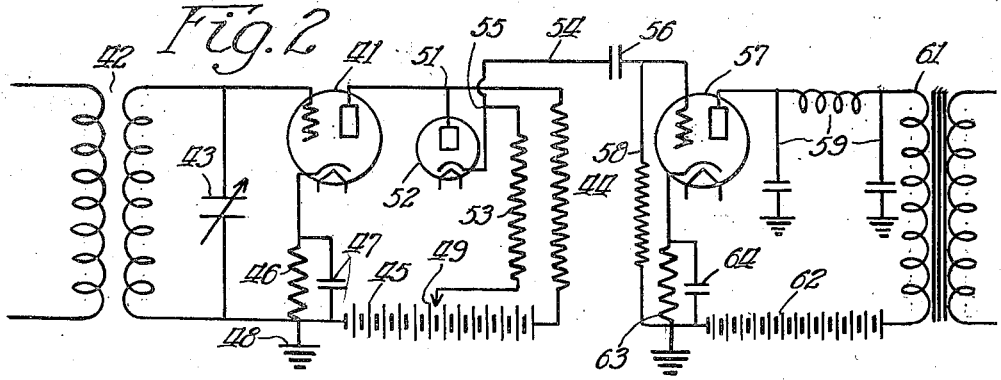

Fig. 2 represents a modified form of the invention operating upon somewhat the same fundamental principle, but differing therefrom in some details. The input or grid circuit of audion 41 has a radio frequency transformer 42 and a variable tuning condenser 43. The anode circuit includes a resistance element 44, a source of energy 45 and a biasing resistance 46 and by-pass condenser 47. The negative side of source 45 is preferably grounded at 48. When no signal potential is impressed on the grid of audion 41 points 49 and 51 will be at equal potentials. Connected across these points is a rectifier 52 having a resistance 53 in series therewith. The ohmic value of resistance 53 is preferably rather high of the order of an ordinary grid leak resistance. An output conductor 54 is connected to a point 55 between rectifier 52 and resistance 53.

It is evident that a radio frequency signal impressed upon the grid of audion 41 will cause the potential of point 51 to become positive and negative with respect to point 49. When point 51 is negative with respect to point 49, no current will flow through the rectifier or resistance 53 and point 55 will be of the same potential as point 49. However, when point 51 becomes positive with respect to point 49, current will flow through the rectifier and resistance 53 and vary the potential of point 55 with respect to point 49. If the resistance 53 is given a large value, only a small amount of current will be required through the resistance to bring point 55 to substantially the same potential as point 51. An output conductor 54 is connected to point 55 and leads through condenser 56 to the grid of an audion 57. A resistance 58 is preferably connected from the grid of audion 57 to ground. The anode circuit of audion 57 includes a filter circuit 59, audion transformer 61, source of energy 62, and a biasing resistance 63 by-passed by a condenser 64. The unidirectional radio frequency signal is impressed upon the grid of audion 57 and is amplified and the amplified output of this audion is filtered and passed through the primary of audio transformer 61.

Figure 3:
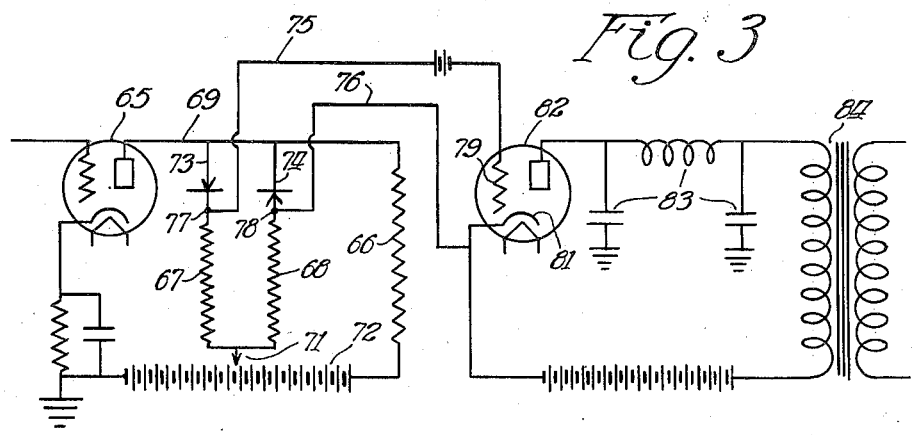

Fig. 3 illustrates the system of Fig. 2 adapted for full wave detection, audion 65 is a radio frequency amplifier and has an impedance 66 in its anode circuit. A pair of resistances 67 and 68 are connected from a conductor 69 which connects the anode of audion 65 to impedance 66 and to a substantially equipotential point 71 of a source of energy 72. Between the resistances 67 and 68 the conductor 69 are valves 73 and 74 respectively, which are connected in opposite directions. Output conductors 75 and 76 are connected to points 77 and 78 and lead the rectified currents to grid 79 and cathode 81 of an audion 82, respectively. Thus both halves of the cycle of the radio frequency wave are impressed cumulatively on the input circuit of audion 82 and are amplified in the anode circuit, which contains a filter system 83 for converting the high frequency impulses to audio frequency. The audio frequency current is applied to the primary of an audio transformer 84.

Figure 4:
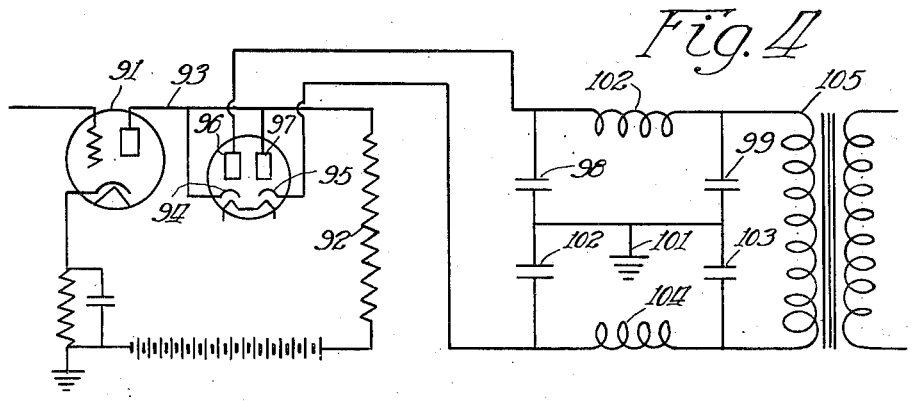

Fig. 4 illustrates a detector system consisting of a radio frequency amplifying audion 91 having an impedance 92 in its output circuit, which is connected to audion 91 by a conductor 93. Connected to conductor 93 is a full wave rectifier tube having indirectly heated cathodes 94 and 95 and anodes 96 and 97. The elements 94 and 96 may be placed in a separate envelope from elements 95 and 97, or if placed in the same envelope they should be spaced as far apart as convenient to avoid interference with each other. Cathode 94 is connected to conductor 93 and anode 96 is connected to an output circuit having parallel condensers 98 and 99 grounded at 101, and a radio frequency choke 102 in series between them. In the other valve of the rectifier, anode 97 is connected to conductor 93 and cathode 95 is connected to the other side of the output circuit having parallel condensers 102 and 103 also grounded at 101 and a radio frequency choke 104 in series between them. The output circuit also includes the primary of an audio transformer 105. The operation of this circuit is as follows: Assuming that a voltage of 180 volts is applied to the anode circuit of audion 91 and that the impedance value of the audion and impedance 92 are so related that conductor 93 has a potential of 90 volts when no signal is impressed on the grid of the audion, the condensers 98, 99, 102 and 103 will then be charged to a potential of 90 volts through elements 95 and 97. If now a signal is impressed on the grid of audion 91 and the grid becomes negative, the potential of conductor 93 will rise to a value of, let us assume 90 plus 3. Condenser 102 will then be charged to the value of 90 plus 3 volts through elements 95 and 97. If the grid then becomes relatively positive on the other half of the cycle, the potential of conductor 93 will fall to a value of 90 minus 3 volts and condenser 98 will discharge to 90 minus 3 volts through elements 94 and 96. The charges on condensers 102 plus 98 will then equalize by a flow of current through the primary of the audio transformer and the following cycle of the radio frequency wave will follow the same course. Thus, the full radio frequency wave will be detected and supplied to the audio transformer.

Figure 5:
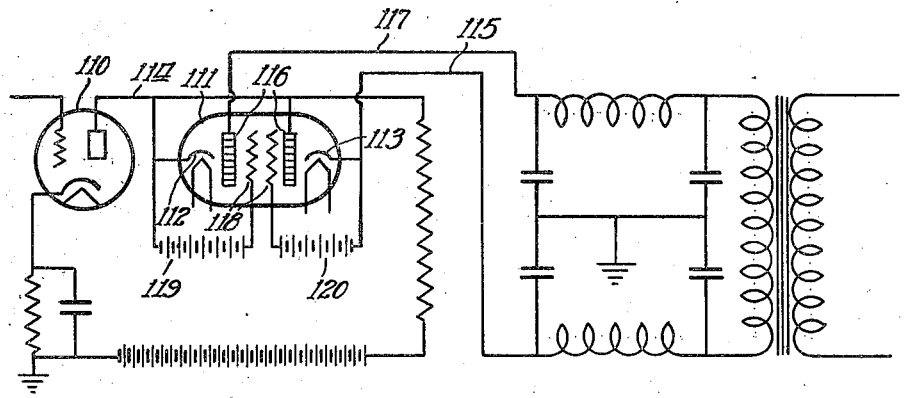

Fig. 5 illustrates a modification of the circuit of Fig. 4. The input circuit of audion 110 may be of any suitable type and the output circuit of detector audion 111 may be similar to that of Fig. 4 and the description thereof is therefore not repeated. Detector audion 111 has a pair of cathodes 112 and 113, one connected to conductor 114 and the other to the conductor 115 leading to the filter circuit, a plate or anode 116, preferably of the mesh type surrounds each of the cathodes, one of the plates being connected to conductor 114 and the other to conductor 117 leading to the other side of the filter circuit. Grids 118 cooperate with the cathodes and plates to increase the electron flow from the cathodes to the plates when the plates become positive relative to their respective cathodes. A battery 119 is connected with its negative side to cathode 112 and its positive side to one of the grids to maintain the grid positive with respect to cathode 112, and a similar battery 120 is connected with its negative side to cathode 113 and its positive side to the other grid.

Figure 6:
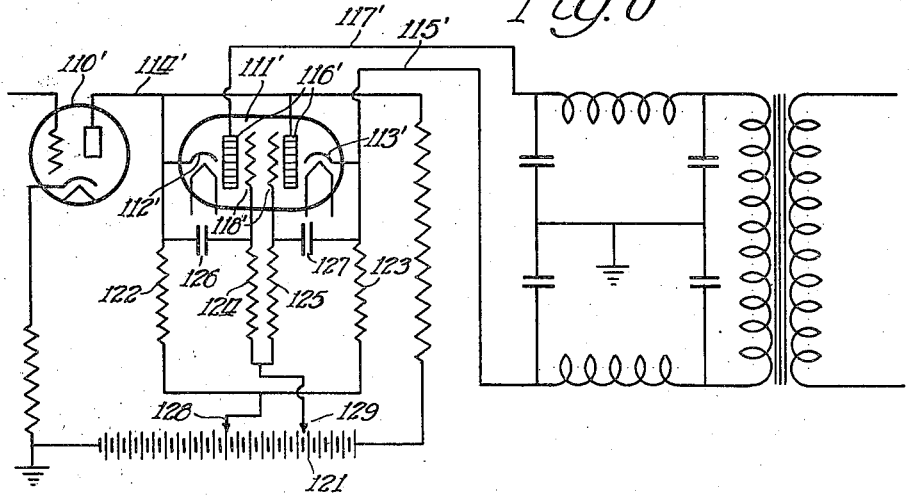

Fig. 6 illustrates a circuit similar to that of Fig. 5, except that batteries 119 and 120 are replaced by a circuit permitting the audion 110' and detector audion 111' to be operated from a single source of energy 121. An impedance 122 is connected to cathode 112' and a similar impedance 123 is connected to cathode 113'. Another impedance 124' is connected to one of the grids and a similar impedance 125 is connected to the other grid. The upper ends of impedances 122 and 124 are connected by a condenser 126 and the upper ends of impedances 123 and 125 are connected by a condenser 127. The opposite ends of impedances 122 and 123 are joined together and connected to a point 128 of source 121. Impedances 124 and 125 are also joined together at their opposite ends and connected to a point 129 of source 121 at a higher potential than point 128. Thus the grids will be maintained at a higher potential than the cathodes causing a large number of electrons to flow from the cathodes to the plates whenever one of the plates becomes positive with respect to its cathode.

What I claim as new and desire to protect by Letters Patent of the United States is:—

1. In a radio system, an audion, an anode circuit for said audion, including an impedance and a source of energy, and a rectifier connected across normally equipotential points in said anode circuit.

2. In a radio system, an audion, an anode circuit including an impedance and a source of energy, a rectifier having anode and cathode elements, one of said elements being connected to a point between the anode and impedance and means connected to the other element for impressing a potential equal to the normal potential of said point to the other element.

3. In a radio system, an audion, an anode circuit including an impedance and a source of energy, a rectifier and impedance in series connected to substantially equipotential points in said anode circuit, and an output conductor connected between said series rectifier and impedance.

4. In a radio system, an audion, an anode circuit including an impedance and a source of energy, a rectifier connected to a point of fluctuating potential in said anode circuit, the other side of the rectifier being connected to an impedance in series with said rectifier, means for applying a potential to the opposite end of said series impedance, which is substantially equal to the normal potential of said point, and an output conductor connected between the rectifier and said series impedance.

5. In a radio system, an audion, an anode circuit, including an impedance, a pair of rectifiers oppositely connected to a point of fluctuating potential in said anode circuit, an audio circuit having one side connected to one of said rectifiers and the other side to the other rectifier, and capacitive means in said audio circuit for receiving energy from said rectifiers.

6. In a radio system, a circuit, means for causing a constant and superposed fluctuating current to flow in said circuit, a pair of rectifiers oppositely connected at one side to a point of fluctuating potential in said circuit, and an output circuit connected to the other sides of said rectifiers and having capacitive means for receiving current impulses from said rectifiers.

7. In a radio system, a full wave detector comprising an audion, an anode circuit, a pair of rectifiers connected to a point of fluctuating potential in said anode circuit, one of said rectifiers being connected inversely with respect to the other, an impedance in series with each of said rectifiers, means connected to the other ends of the impedances for applying a constant potential to the other ends of said impedances, and output conductors connected between the rectifiers and impedances.

8. In a radio system, an audion, an anode circuit therefor, including an impedance and a source of energy, a pair of rectifiers connected to a point of fluctuating potential in said circuit, one of said rectifiers being inversely connected with respect to the other, an impedance in series with each of said rectifiers, means connected to the other ends of the impedances for applying a potential to the other end of said impedances, a second audion having a grid and cathode in its input circuit, a pair of conductors connected between said rectifiers and impedances, one of said conductors being connected to the grid of the second audion and the other being connected to the cathode.

9. In a radio system, an audion, an anode circuit therefor, including an impedance, and a rectifier connected across normally equipotential points in said circuit, one of said points being so chosen as to have a substantially constant potential when the impedance of the audion is varied, the other point being so chosen as to have a varying potential when the impedance of the audion is varied.

10. In a radio system, an audion, an anode circuit therefor, including an impedance and a source of energy, a pair of rectifiers connected to a point of fluctuating potential in said anode circuit, a transformer having its primary circuit connected to said rectifiers, and a grounded condenser connected in parallel with respect to said transformer primary in each lead between the rectifiers and transformer primary.

11. In a radio system, an audion, an anode circuit for said audion including an impedance and a source of energy, a rectifier connected across normally substantially equipotential points in said anode circuit, and an output circuit connected to one of said points.

HARRY C. DUFT.